United States Patent
Tang et al.

(10) Patent No.: US 11,394,539 B2
(45) Date of Patent: Jul. 19, 2022

(54) PERSISTENT MEMORY PASSPHRASE MANAGEMENT

(71) Applicant: Dell Products L.P., Round Rock, TX (US)

(72) Inventors: Wenwei Tang, Shanghai (CN); Joan Jun Xiong, Shanghai (CN)

(73) Assignee: Dell Products L.P., Round Rock, TX (US)

( * ) Notice: Subject to any disclaimer, the term of this patent is extended or adjusted under 35 U.S.C. 154(b) by 86 days.

(21) Appl. No.: 16/916,614

(22) Filed: Jun. 30, 2020

(65) Prior Publication Data

US 2021/0391989 A1  Dec. 16, 2021

(30) Foreign Application Priority Data

Jun. 15, 2020 (CN) .......................... 202010541468.7

(51) Int. Cl.
*G06F 21/60* (2013.01)
*H04L 29/06* (2006.01)
*H04L 9/08* (2006.01)
*G06F 21/57* (2013.01)
*G06F 21/31* (2013.01)
(Continued)

(52) U.S. Cl.
CPC ............ *H04L 9/0863* (2013.01); *G06F 21/31* (2013.01); *G06F 21/572* (2013.01); *G06F 21/577* (2013.01); *G06F 21/602* (2013.01); *G06F 21/78* (2013.01); *H04L 9/0825* (2013.01); *H04L 9/3249* (2013.01)

(58) Field of Classification Search
CPC ... H04L 9/0863; H04L 9/0825; H04L 9/3249; G06F 21/31; G06F 21/572; G06F 21/577; G06F 21/602; G06F 21/78
See application file for complete search history.

(56) References Cited

U.S. PATENT DOCUMENTS

| 2009/0208019 A1* | 8/2009 | Celik | ...................... H04L 9/085 |
| | | | 380/277 |
| 2020/0409871 A1* | 12/2020 | Liu | ....................... G06F 21/575 |

FOREIGN PATENT DOCUMENTS

| CN | 110363034 A | 10/2019 |
| WO | 2018022091 A1 | 2/2018 |

OTHER PUBLICATIONS

International Search Report and Written Opinion of the International Searching Authority, International Application No. PCT/US21/037263, dated Sep. 28, 2021.

(Continued)

*Primary Examiner* — Izunna Okeke
(74) *Attorney, Agent, or Firm* — Jackson Walker L.L.P.

(57) ABSTRACT

An information handling system may include a persistent memory configured to be secured via a passphrase; a basic input/output system (BIOS); and a management controller configured to provide out-of-band management of the information handling system. The BIOS may be configured to set the passphrase of the persistent memory, encrypt the passphrase via a first key of a first asymmetric key pair, and transmit the encrypted passphrase to the management controller. The management controller may be configured to decrypt the encrypted passphrase via a second key of the first asymmetric key pair, re-encrypt the passphrase via a first key of a second asymmetric key pair, and transmit the re-encrypted passphrase to an external management console via an out-of-band management interface.

17 Claims, 2 Drawing Sheets

(51) Int. Cl.
*G06F 21/78* (2013.01)
*H04L 9/32* (2006.01)

(56) References Cited

OTHER PUBLICATIONS

Menezes, A., et al., "Handbook of Applied Cryptology," XP-055119322, Chapter 12, Dec. 31, 1997.

* cited by examiner

PERSISTENT MEMORY PASSPHRASE MANAGEMENT

TECHNICAL FIELD

The present disclosure relates in general to information handling systems, and more particularly to passphrase management for persistent memory systems.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Various types of persistent memory are becoming more popular, particularly for use in datacenter environments. For example, various types of non-volatile dual in-line memory modules (NVDIMMs) are in common use. As another example, the Intel® Data Center Persistent Memory Module (DCPMM) is an emerging technology where non-volatile media is placed onto a DIMM form factor (e.g., a standard DDR4 DIMM form factor) and installed on the memory bus.

Persistent memory DIMMs may exist alongside traditional volatile memory DRAM DIMMs. The main difference between persistent memory DIMMs and DRAM DIMMs is that the data stored on persistent memory DIMMs can be retained when the system is shut down or loses power. This allows persistent memory to be used as a form of permanent storage like hard disk drives (HDDs), solid-state drives (SSDs), etc., but with memory-like latencies.

Some types of persistent memory modules can be configured for use in different modes. For example, a Memory Mode, an App Direct Mode, or a combination of Memory Mode and App Direct Mode (referred to as "Mixed Mode") may be available on some devices.

In Memory Mode, the persistent memory may act as volatile system memory under the control of the operating system. Any DRAM in the platform may act as a cache, working in conjunction with the persistent memory. In App Direct Mode, the persistent memory and DRAM DIMMs may act as independent memory resources under direct load/store control of an application. This may allow the persistent memory capacity to be used as byte-addressable persistent memory that is mapped into the system physical address space (SPA) and is directly accessible by applications. In Mixed Mode, some portion of the persistent memory capacity is used in Memory Mode, and the remainder in App Direct Mode.

To secure the data on a persistent memory, a passphrase (e.g., a 32-byte user-designated passphrase) may be provided for user authentication and unlocking of the persistent memory region. For purposes of this disclosure, the terms "passphrase" and "password" may be used interchangeably. For example, some passphrase systems may allow spaces and other special characters, while some password systems may not. Embodiments of this disclosure may be applied to any of such variations in passphrase/password construction.

One problem introduced by some persistent memory security mechanism is that lost passphrases on security-enabled persistent memory modules can result in persistent memory (PM) mode "bricking" (e.g., permanent unavailability). That is, in App Direct Mode, the entire persistent memory may become unavailable. In Mixed Mode, the portion of the persistent memory capacity that is being used in App Direct Mode may become unavailable.

Embodiments of this disclosure may provide techniques for avoiding this problem. Some embodiments may be particularly applicable to hyper-converged infrastructure (HCI) environments.

Hyper-converged infrastructure (HCI) generally refers to a software-defined IT infrastructure, which typically includes elements such as virtualized computing (e.g., a hypervisor), software-defined storage, and virtualized networking (e.g., software-defined networking).

It should be noted that the discussion of a technique in the Background section of this disclosure does not constitute an admission of prior-art status. No such admissions are made herein, unless clearly and unambiguously identified as such.

SUMMARY

In accordance with the teachings of the present disclosure, the disadvantages and problems associated with passphrase management for persistent memory systems may be reduced or eliminated.

In accordance with embodiments of the present disclosure, an information handling system may include a persistent memory configured to be secured via a passphrase; a basic input/output system (BIOS); and a management controller configured to provide out-of-band management of the information handling system. The BIOS may be configured to set the passphrase of the persistent memory, encrypt the passphrase via a first key of a first asymmetric key pair, and transmit the encrypted passphrase to the management controller. The management controller may be configured to decrypt the encrypted passphrase via a second key of the first asymmetric key pair, re-encrypt the passphrase via a first key of a second asymmetric key pair, and transmit the re-encrypted passphrase to an external management console via an out-of-band management interface.

In accordance with these and other embodiments of the present disclosure, a method may include a basic input/output system (BIOS) of an information handling system setting a passphrase of a persistent memory of the information handling system; the BIOS encrypting the passphrase via a first key of a first asymmetric key pair; the BIOS transmitting the encrypted passphrase to a management controller configured to provide out-of-band management of the information handling system; the management controller decrypting the encrypted passphrase via a second key of the first asymmetric key pair; the management controller re-encrypting the passphrase via a first key of a second asymmetric key pair; and the management controller transmitting the re-encrypted passphrase to an external management console via an out-of-band management interface.

In accordance with these and other embodiments of the present disclosure, an article of manufacture may include a non-transitory, computer-readable medium having computer-executable code thereon that is executable by an information handling system for: causing a basic input/output system (BIOS) of the information handling system to set a passphrase of a persistent memory of the information handling system; causing the BIOS to encrypt the passphrase via a first key of a first asymmetric key pair; causing the BIOS to transmit the encrypted passphrase to a management controller configured to provide out-of-band management of the information handling system; causing the management controller to decrypt the encrypted passphrase via a second key of the first asymmetric key pair; causing the management controller to re-encrypt the passphrase via a first key of a second asymmetric key pair; and causing the management controller to transmit the re-encrypted passphrase to an external management console via an out-of-band management interface.

Technical advantages of the present disclosure may be readily apparent to one skilled in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Figure 1:
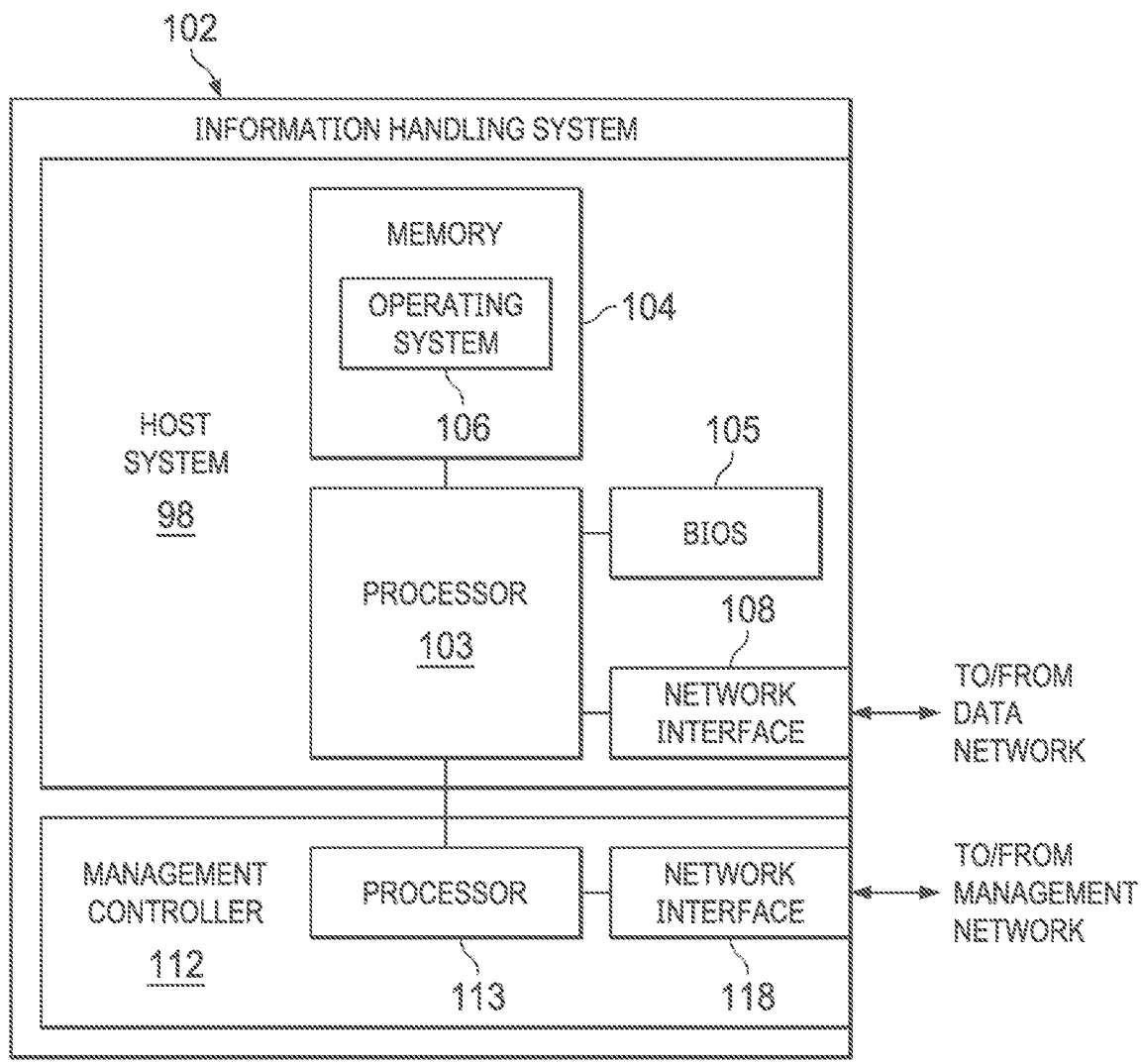
FIG. 1 illustrates a block diagram of an example information handling system, in accordance with embodiments of the present disclosure.
Figure 2:
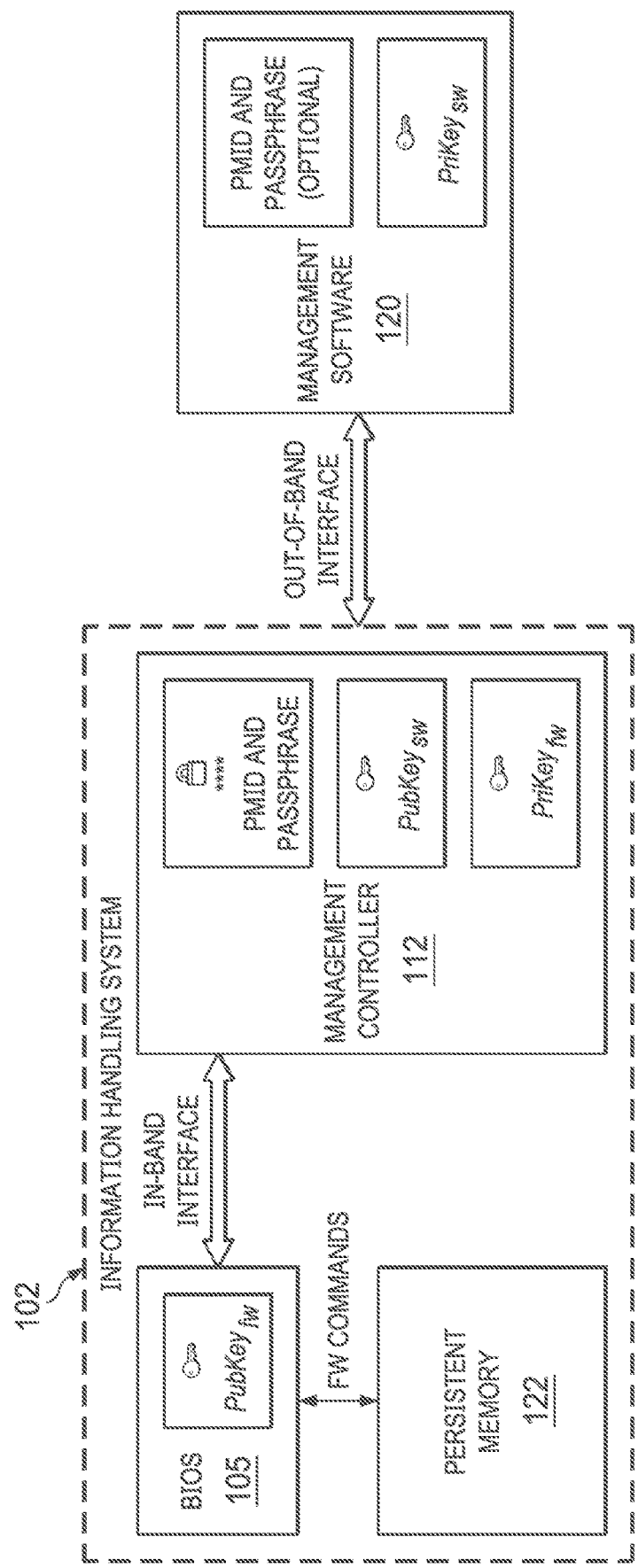
FIG. 2 illustrates a block diagram of a persistent memory passphrase management system, in accordance with embodiments of this disclosure.

Preferred embodiments and their advantages are best understood by reference to FIGS. 1 and 2, wherein like numbers are used to indicate like and corresponding parts.

For the purposes of this disclosure, the term "information handling system" may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a personal digital assistant (PDA), a consumer electronic device, a network storage device, or any other suitable device and may vary in size, shape, performance, functionality, and price. The information handling system may include memory, one or more processing resources such as a central processing unit ("CPU") or hardware or software control logic. Additional components of the information handling system may include one or more storage devices, one or more communications ports for communicating with external devices as well as various input/output ("I/O") devices, such as a keyboard, a mouse, and a video display. The information handling system may also include one or more buses operable to transmit communication between the various hardware components.

For purposes of this disclosure, when two or more elements are referred to as "coupled" to one another, such term indicates that such two or more elements are in electronic communication or mechanical communication, as applicable, whether connected directly or indirectly, with or without intervening elements.

When two or more elements are referred to as "coupleable" to one another, such term indicates that they are capable of being coupled together.

For the purposes of this disclosure, the term "computer-readable medium" (e.g., transitory or non-transitory computer-readable medium) may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; communications media such as wires, optical fibers, microwaves, radio waves, and other electromagnetic and/or optical carriers; and/or any combination of the foregoing.

For the purposes of this disclosure, the term "information handling resource" may broadly refer to any component system, device, or apparatus of an information handling system, including without limitation processors, service processors, basic input/output systems, buses, memories, I/O devices and/or interfaces, storage resources, network interfaces, motherboards, and/or any other components and/or elements of an information handling system.

For the purposes of this disclosure, the term "management controller" may broadly refer to an information handling system that provides management functionality (typically out-of-band management functionality) to one or more other information handling systems. In some embodiments, a management controller may be (or may be an integral part of) a service processor, a baseboard management controller (BMC), a chassis management controller (CMC), or a remote access controller (e.g., a Dell Remote Access Controller (DRAC) or Integrated Dell Remote Access Controller (iDRAC)).

FIG. 1 illustrates a block diagram of an example information handling system 102, in accordance with embodiments of the present disclosure. In some embodiments, information handling system 102 may comprise a server chassis configured to house a plurality of servers or "blades." In other embodiments, information handling system 102 may comprise a personal computer (e.g., a desktop computer, laptop computer, mobile computer, and/or notebook computer). In yet other embodiments, information handling system 102 may comprise a storage enclosure configured to house a plurality of physical disk drives and/or other computer-readable media for storing data (which may generally be referred to as "physical storage resources"). As shown in FIG. 1, information handling system 102 may comprise a processor 103, a memory 104 communicatively coupled to processor 103, a BIOS 105 (e.g., a UEFI BIOS) communicatively coupled to processor 103, a network interface 108 communicatively coupled to processor 103, and a management controller 112 communicatively coupled to processor 103.

In operation, processor 103, memory 104, BIOS 105, and network interface 108 may comprise at least a portion of a host system 98 of information handling system 102. In addition to the elements explicitly shown and described, information handling system 102 may include one or more other information handling resources.

Processor 103 may include any system, device, or apparatus configured to interpret and/or execute program instructions and/or process data, and may include, without limitation, a microprocessor, microcontroller, digital signal processor (DSP), application specific integrated circuit (ASIC), or any other digital or analog circuitry configured to interpret and/or execute program instructions and/or process data. In some embodiments, processor 103 may interpret and/or execute program instructions and/or process data stored in memory 104 and/or another component of information handling system 102.

Memory 104 may be communicatively coupled to processor 103 and may include any system, device, or apparatus configured to retain program instructions and/or data for a period of time (e.g., computer-readable media). Memory 104 may include RAM, EEPROM, a PCMCIA card, flash memory, magnetic storage, opto-magnetic storage, or any suitable selection and/or array of volatile or non-volatile memory that retains data after power to information handling system 102 is turned off.

As shown in FIG. 1, memory 104 may have stored thereon an operating system 106. Operating system 106 may comprise any program of executable instructions (or aggregation of programs of executable instructions) configured to manage and/or control the allocation and usage of hardware resources such as memory, processor time, disk space, and input and output devices, and provide an interface between such hardware resources and application programs hosted by operating system 106. In addition, operating system 106 may include all or a portion of a network stack for network communication via a network interface (e.g., network interface 108 for communication over a data network). Although operating system 106 is shown in FIG. 1 as stored in memory 104, in some embodiments operating system 106 may be stored in storage media accessible to processor 103, and active portions of operating system 106 may be transferred from such storage media to memory 104 for execution by processor 103.

Network interface 108 may comprise one or more suitable systems, apparatuses, or devices operable to serve as an interface between information handling system 102 and one or more other information handling systems via an in-band network. Network interface 108 may enable information handling system 102 to communicate using any suitable transmission protocol and/or standard. In these and other embodiments, network interface 108 may comprise a network interface card, or "NIC." In these and other embodiments, network interface 108 may be enabled as a local area network (LAN)-on-motherboard (LOM) card.

Management controller 112 may be configured to provide management functionality for the management of information handling system 102. Such management may be made by management controller 112 even if information handling system 102 and/or host system 98 are powered off or powered to a standby state. Management controller 112 may include a processor 113, memory, and a network interface 118 separate from and physically isolated from network interface 108.

As shown in FIG. 1, processor 113 of management controller 112 may be communicatively coupled to processor 103. Such coupling may be via a Universal Serial Bus (USB), System Management Bus (SMBus), and/or one or more other communications channels.

Network interface 118 may be coupled to a management network, which may be separate from and physically isolated from the data network as shown. Network interface 118 of management controller 112 may comprise any suitable system, apparatus, or device operable to serve as an interface between management controller 112 and one or more other information handling systems via an out-of-band management network. Network interface 118 may enable management controller 112 to communicate using any suitable transmission protocol and/or standard. In these and other embodiments, network interface 118 may comprise a network interface card, or "NIC." Network interface 118 may be the same type of device as network interface 108, or in other embodiments it may be a device of a different type.

Memory 104 of information handling system 102 may comprise (in whole or in part) one or more persistent memory modules. As discussed above, a lost passphrase in a security system for such a persistent memory may result in total or partial bricking of a persistent memory module. For example, a lost passphrase on a security-enabled persistent memory module may result in bricking of the persistent memory mode functionality bricking. (Memory mode functionality is typically not affected by a lost passphrase.)

Accordingly, embodiments of this disclosure may provide a passphrase management system able to prevent such problems in an information handling system such as information handling system 102. In some embodiments, the passphrase management system may rely on BIOS 105 to set the passphrase of the persistent memory (e.g., such that the persistent memory becomes protected via the selected passphrase). The passphrase management system may further rely on management controller 112 (e.g., a BMC) and its firmware to manage the interface between system management software (e.g., operating on a management console coupled to management controller 112 via network interface 118) and the platform firmware/hardware of information handling system 102. The system management software may provide high-level management functionality for server nodes and clusters, such as information handling system 102.

FIG. 2 provides another block diagram of information handling system 102. Some elements shown in FIG. 1 are omitted from FIG. 2 for the sake of clarity. Other components which are not shown explicitly in FIG. 1 are shown in FIG. 2. In particular, FIG. 2 illustrates some of the components of an embodiment of a passphrase management system according to this disclosure.

In some embodiments, two sets of asymmetric cryptographic key pairs may be used. Such key pairs may be in accordance with the Rivest-Shamir-Adleman (RSA) cryptosystem or any other suitable cryptosystem.

As discussed in further detail below, the first asymmetric key pair may be used for protecting passphrase transfer between BIOS 105 and management controller 112, because in some embodiments the in-band channel (e.g., a keyboard controller style (KCS) interface) is not a secure channel. The public part of the first key pair will be referred to as $PubKey_{fw}$, and the private part of the first key pair will be referred to as $PriKey_{fw}$ (wherein FW refers to firmware).

The second asymmetric key pair may be used to secure the passphrase exchange between the management software and management controller 112. The public part of the second key pair will be referred to as $PubKey_{sw}$, and the private part of the second key pair will be referred to as $PriKey_{sw}$ (wherein SW refers to software).

As one of ordinary skill in the art with the benefit of this disclosure will understand, the designations "public" and "private" are used to distinguish the keys, and they do not necessarily imply that the public keys are publicly available.

$PubKey_{fw}$, $PubKey_{sw}$, and $PriKey_{fw}$ may be securely stored in internal storage firmware of information handling system 102 (e.g., in BIOS 105 and/or in management controller 112). Initial key deployment may happen during the manufacturing process, and any key updates may be deployed as part of the firmware update process.

Management software 120 (e.g., operating on a management console coupled to management controller 112 via network interface 118) may store $PriKey_{sw}$ in its secure key storage. Existing solutions for such secure key storage in the management software will be understood by one of ordinary skill in the art with the benefit of this disclosure.

Additionally, the PMID (persistent memory identifier such as a DCPMM ID) and passphrase may be stored at management controller 112. In some embodiments, the PMID and passphrase may also be stored at management software 120.

Various examples of passphrase propagation and storage are possible within the context of information handling system 102. For example, if a user enters a passphrase via a setup page of BIOS 105, the following sequence may take place:
1. The passphrase may be set on the persistent memory via one or more FW commands.
2. BIOS 105 may read the corresponding identity information from the persistent memory via one or more FW commands.
3. BIOS 105 may encrypt the passphrase and PMID with $PubKey_{fw}$ and then send the result to management controller 112 through an in-band interface.
4. Management controller 112 may receive and decrypt the payload with $PriKey_{fw}$, and then store the PMID-passphrase pair in its internal storage, which is only accessible by management controller 112.
5. Management controller 112 may encrypt the PMID and passphrase with $PubKey_{sw}$ and send it to the management software 120 in some embodiments.
6. Management software 120 may decrypt the PMID and passphrase with $PriKey_{sw}$, and store the result in its secure key storage in some embodiments.

As another example, a user may enter a passphrase via the graphical user interface (GUI) or application programming interface (API) of management controller 112. In that situation, the following sequence may take place:
1. Management controller 112 may store the PMID-passphrase pair in its internal storage, which is only accessible by management controller 112.
2. Management controller 112 may encrypt the passphrase and PMID with $PriKey_{fw}$ and then send the result to BIOS 105. BIOS 105 may decrypt the payload with $PubKey_{fw}$ and set the passphrase on the persistent memory via one or more FW commands.
3. Management controller 112 may encrypt the PMID and passphrase with $PubKey_{sw}$ and send the result to management software 120 in some embodiments.
4. Management software 120 may decrypt the PMID and passphrase with $PriKey_{sw}$ and store the result in its secure key storage in some embodiments.

As yet another example, a user may enter a passphrase at management software 120. In that situation, the following sequence may take place:
1. Management software 120 may store the PMID and passphrase in its secure key storage in some embodiments.
2. Management software 120 may encrypt the PMID and passphrase with $PriKey_{sw}$ and send the encrypted payload to management controller 112 via the out-of-band interface in some embodiments.
3. Management controller 112 may decrypt the PMID and passphrase with $PubKey_{sw}$ and store the PMID-passphrase pair in its internal storage in some embodiments.
4. Management controller 112 may encrypt the PMID and passphrase with $PriKey_{fw}$ and send the result to BIOS 105. BIOS 105 may then decrypt the payload with $PubKey_{fw}$ and set the passphrase on the persistent memory via one or more FW commands.

This framework also enables many other features related to passphrase management. For example, if any persistent memory modules are removed or added, management controller 112 may detect such a change with the assistance of BIOS 105. Then management controller 112 may notify management software 120 of the hardware change.

When a new persistent memory module with a passphrase set is added to the host, management software 120 may match the PMID against a list, database, or any other suitable data structure of PMIDs. If the PMID can be matched, then management software 120 may propagate the passphrase to management controller 120 and BIOS 105 (e.g., by using the methods described above) to enable the new module's persistent memory capacity. If the PMID cannot be matched, then management software 120 may prompt the user for a new passphrase, and propagate that passphrase to management controller 112 and BIOS 105 (e.g., by using the methods described above) to reclaim the persistent memory capacity.

When a module is removed, management controller 112 and management software 120 may retain the PMID and passphrase for future reference.

Thus embodiments of this disclosure provide many advantages. For example, the propagation of a persistent memory passphrase to allows stranded persistent memory capacity to be avoided. Further, the establishment of a PMID and passphrase database allows for device and passphrase matching. Still further, mechanisms are provided to automatically migrate a passphrase between hosts managed by management software. Yet further, mechanisms are provided to transfer a passphrase and PMID between system components.

Although various possible advantages with respect to embodiments of this disclosure have been described, one of ordinary skill in the art with the benefit of this disclosure will understand that in any particular embodiment, not all of such advantages may be applicable. In any particular embodiment, some, all, or even none of the listed advantages may apply.

This disclosure encompasses all changes, substitutions, variations, alterations, and modifications to the exemplary embodiments herein that a person having ordinary skill in the art would comprehend. Similarly, where appropriate, the appended claims encompass all changes, substitutions, variations, alterations, and modifications to the exemplary embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

Further, reciting in the appended claims that a structure is "configured to" or "operable to" perform one or more tasks is expressly intended not to invoke 35 U.S.C. § 112(f) for that claim element. Accordingly, none of the claims in this application as filed are intended to be interpreted as having means-plus-function elements. Should Applicant wish to invoke § 112(f) during prosecution, Applicant will recite claim elements using the "means for [performing a function]" construct.

All examples and conditional language recited herein are intended for pedagogical objects to aid the reader in understanding the invention and the concepts contributed by the inventor to furthering the art, and are construed as being without limitation to such specifically recited examples and conditions. Although embodiments of the present inventions have been described in detail, it should be understood that various changes, substitutions, and alterations could be made hereto without departing from the spirit and scope of the disclosure.

What is claimed is:

1. An information handling system comprising:
    a persistent memory configured to be secured via a passphrase;
    a basic input/output system (BIOS); and
    a management controller configured to provide out-of-band management of the information handling system;
    wherein the BIOS is configured to set the passphrase of the persistent memory, encrypt the passphrase via a first key of a first asymmetric key pair, and transmit the encrypted passphrase to the management controller; and
    wherein the management controller is configured to decrypt the encrypted passphrase via a second key of the first asymmetric key pair, re-encrypt the passphrase via a first key of a second asymmetric key pair, wherein the second asymmetric key pair is different from the first asymmetric key pair, and transmit the re-encrypted passphrase to an external management console via an out-of-band management interface, the external management console being configured to decrypt the re-encrypted passphrase via a second key of the second asymmetric key pair.

2. The information handling system of claim 1, wherein the BIOS is a Unified Extensible Firmware Interface (UEFI) BIOS.

3. The information handling system of claim 1, wherein the management controller is a baseboard management controller (BMC).

4. The information handling system of claim 1, wherein the external management console is configured to store a list of persistent memory identifiers and corresponding passphrases.

5. The information handling system of claim 1, wherein the BIOS is configured to transmit the encrypted passphrase to the management controller via an in-band interface.

6. The information handling system of claim 5, wherein the in-band interface is a keyboard controller style (KCS) interface.

7. A method comprising:
    a basic input/output system (BIOS) of an information handling system setting a passphrase of a persistent memory of the information handling system;
    the BIOS encrypting the passphrase via a first key of a first asymmetric key pair;
    the BIOS transmitting the encrypted passphrase to a management controller configured to provide out-of-band management of the information handling system;
    the management controller decrypting the encrypted passphrase via a second key of the first asymmetric key pair;
    the management controller re-encrypting the passphrase via a first key of a second asymmetric key pair wherein the second asymmetric key pair is different from the first asymmetric key pair;
    the management controller transmitting the re-encrypted passphrase to an external management console via an out-of-band management interface; and
    the external management console decrypting the re-encrypted passphrase via a second key of the second asymmetric key pair.

8. The method of claim 7, wherein the BIOS is a Unified Extensible Firmware Interface (UEFI) BIOS.

9. The method of claim 7, wherein the management controller is a baseboard management controller (BMC).

10. The method of claim 7, further comprising storing, at the external management console, a list of persistent memory identifiers and corresponding passphrases.

11. The method of claim 7, wherein the BIOS transmits the encrypted passphrase to the management controller via an in-band interface.

12. An article of manufacture comprising a non-transitory, computer-readable medium having computer-executable code thereon that is executable by an information handling system for:
    causing a basic input/output system (BIOS) of the information handling system to set a passphrase of a persistent memory of the information handling system;
    causing the BIOS to encrypt the passphrase via a first key of a first asymmetric key pair;
    causing the BIOS to transmit the encrypted passphrase to a management controller configured to provide out-of-band management of the information handling system;
    causing the management controller to decrypt the encrypted passphrase via a second key of the first asymmetric key pair;
    causing the management controller to re-encrypt the passphrase via a first key of a second asymmetric key pair wherein the second asymmetric key pair is different from the first asymmetric key pair; and
    causing the management controller to transmit the re-encrypted passphrase to an external management console via an out-of-band management interface, the external management console being configured to decrypt the re-encrypted passphrase via a second key of the second asymmetric key pair.

13. The article of claim 12, wherein the BIOS is a Unified Extensible Firmware Interface (UEFI) BIOS.

14. The article of claim 12, wherein the management controller is a baseboard management controller (BMC).

15. The article of claim 12, wherein the external management console is configured to store a list of persistent memory identifiers and corresponding passphrases.

16. The article of claim 12, wherein the BIOS is configured to transmit the encrypted passphrase to the management controller via an in-band interface.

17. The article of claim 12, wherein the first and second asymmetric key pairs are Rivest-Shamir-Adleman (RSA) key pairs.

\* \* \* \* \*